United States Patent
Nir et al.

(10) Patent No.: US 12,237,951 B2
(45) Date of Patent: Feb. 25, 2025

(54) AMPLITUDE OPTIMIZED REFLECTION CANCELLER IN PARALLEL CHANNEL EQUALIZERS

(71) Applicant: HUAWEI TECHNOLOGIES CO., LTD., Shenzhen (CN)

(72) Inventors: Ehud Nir, Kanata (CA); Yanggao Qiu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 85 days.

(21) Appl. No.: 18/349,635

(22) Filed: Jul. 10, 2023

(65) Prior Publication Data
US 2023/0353429 A1   Nov. 2, 2023

Related U.S. Application Data

(63) Continuation of application No. PCT/CN2021/071963, filed on Jan. 15, 2021.

(51) Int. Cl.
*H04L 25/03* (2006.01)
*H04L 27/00* (2006.01)

(52) U.S. Cl.
CPC .... *H04L 25/03343* (2013.01); *H04L 27/0014* (2013.01); *H04L 2027/0038* (2013.01)

(58) Field of Classification Search
CPC ........... H04L 25/03343; H04L 27/0014; H04L 2027/0038; H04L 25/0212; H04L 25/03057; H04L 27/01
See application file for complete search history.

(56) References Cited

U.S. PATENT DOCUMENTS

| | | | |
|---|---|---|---|
| 8,582,635 B2 | 11/2013 | Prokop et al. | |
| 9,485,058 B2 | 11/2016 | Riani et al. | |
| 2007/0121716 A1 | 5/2007 | Nagarajan et al. | |
| 2010/0054367 A1 | 3/2010 | Gorday | |
| 2011/0311008 A1 | 12/2011 | Slezak et al. | |
| 2014/0029651 A1 | 1/2014 | Zhong | |
| 2017/0187552 A1* | 6/2017 | Sakai | H04L 25/03057 |
| 2023/0119007 A1* | 4/2023 | Choudhary | H04L 25/03076 375/230 |

FOREIGN PATENT DOCUMENTS

| | | |
|---|---|---|
| CN | 101848007 A | 9/2010 |
| CN | 109981500 A | 7/2019 |

* cited by examiner

*Primary Examiner* — Jean B Corrielus (57) ABSTRACT

Methods and systems for equalizing signals are disclosed. In an example, a method for equalizing a digital signal at an equalizer, comprises: receiving, at the equalizer, a plurality of samples of the signal in a plurality of unit intervals (UIs) of a channel response of the digital signal, the plurality of samples comprising a first plurality of samples of a primary response and a second plurality of samples of one or more reflection responses; equalizing, by the equalizer, the first plurality of samples using a first set bitwidth; equalizing the second plurality of samples using one or more further set bitwidths, wherein the first set bitwidth is greater than each of the one or more further set bitwidths; and generating, by the equalizer, an equalized digital signal.

20 Claims, 8 Drawing Sheets

AMPLITUDE OPTIMIZED REFLECTION CANCELLER IN PARALLEL CHANNEL EQUALIZERS

CROSS-REFERENCE TO RELATED APPLICATION(S)

This application is a continuation application of PCT patent application No. PCT/CN2021/071963, filed Jan. 15, 2021, entitled AMPLITUDE OPTIMIZED REFLECTION CANCELLER IN PARALLEL CHANNEL EQUALIZERS, the entire contents of which are incorporated by reference into the Detailed Description herein below.

TECHNICAL FIELD

Example embodiments relate to signal processing, and in particular, to methods and systems for equalizing signals.

BACKGROUND

Inter-symbol interference (ISI) may be introduced into a received signal due to reflection responses, which may be caused by limited channel bandwidth or other conditions in a transmission channel. ISI obscures adjacent bits or symbols. Equalizers, such as a feed-forward equalizer (FFE) and a decision feedback equalizer (DFE), may be used to compensate for the loss of a received signal.

In order to mitigate significant ISI components from a transmission channel, delay lines of an equalizer may need to span several tens of unit intervals (UI) of a channel response of the signal. Such an equalizer may result in significant increase of the number of the multipliers used in the delay lines of the equalizer. An increased number of multipliers of the delay lines can substantially increase the area and power consumption of the multipliers of the equalizer.

SUMMARY

Example embodiments include an equalizer and method which have a plurality of set bitwidths to equalize samples of a signal. The set bitwidths are selected or designed based on the amplitude variations of reflection responses in a channel response of a signal. A reflection response with a lower peak in the channel response may be equalized with a lower set bitwidth.

An advantage of the equalizer and method is that the set bitwidths with the lower set bitwidth can reduce the number of the multiplexers used in the equalizer. The reduced number of multiplexers in turn reduces the multiplexer area of the equalizer and reduces the power consumption of the equalizer.

In another example, each successive reflection response is equalized with a successively lower set bitwidth.

In another example, the plurality of set bitwidths are a plurality of optimized bitwidths. For example, the plurality of optimized bitwidths are optimized for total bitwidth, which in turn optimizes surface area and power consumption of the equalizer and method. In some examples, roaming taps are used to equalize the reflection responses.

An advantage of the equalizer and method is that the surface area and power consumption can be optimized based on the selection of the optimized bitwidths.

Another example embodiment is a, a method for equalizing a digital signal at an equalizer, comprises: receiving, at the equalizer, a plurality of samples of the signal in a plurality of unit intervals (UIs) of a channel response of the digital signal, the plurality of samples comprising a first plurality of samples of a primary response and a second plurality of samples of one or more reflection responses; equalizing, by the equalizer, the first plurality of samples using a first set bitwidth; equalizing the second plurality of samples using one or more further set bitwidths, wherein the first set bitwidth is greater than each of the one or more further set bitwidths; and generating, by the equalizer, an equalized digital signal.

Another example embodiment is a equalizer for equalizing a digital signal, comprising: a plurality of delays; a plurality of multiplexers; and one or more adders, wherein the equalizer is configured to: receive, at the plurality of delays or at the plurality of multiplexers, a plurality of samples of the signal in a plurality of unit intervals (UIs) of a channel response of the digital signal, the plurality samples comprising a first plurality of samples of a primary response and a second plurality of samples of one or more reflection responses; equalize, at the plurality of delays and the plurality of multiplexers, the first plurality of samples using a first set bitwidth; equalize, at the plurality of delays and the plurality of multiplexers, the second plurality of samples using one or more further bitwidths, wherein the first set bitwidth is greater than each of the one or more further bitwidths; and generate, at the one or more adders, an equalized digital signal.

Another example embodiment is an equalizer configured to perform a method in accordance with any of the above.

Another example embodiment is a receiver configured to perform a method in accordance with any of the above.

Another example embodiment is a receiver that includes any of the above equalizers.

BRIEF DESCRIPTION OF THE DRAWINGS

Reference will now be made, by way of example, to the accompanying drawings which show example embodiments, and in which.

Similar reference numerals may have been used in different figures to denote similar components.

DETAILED DESCRIPTION

Figure 1:
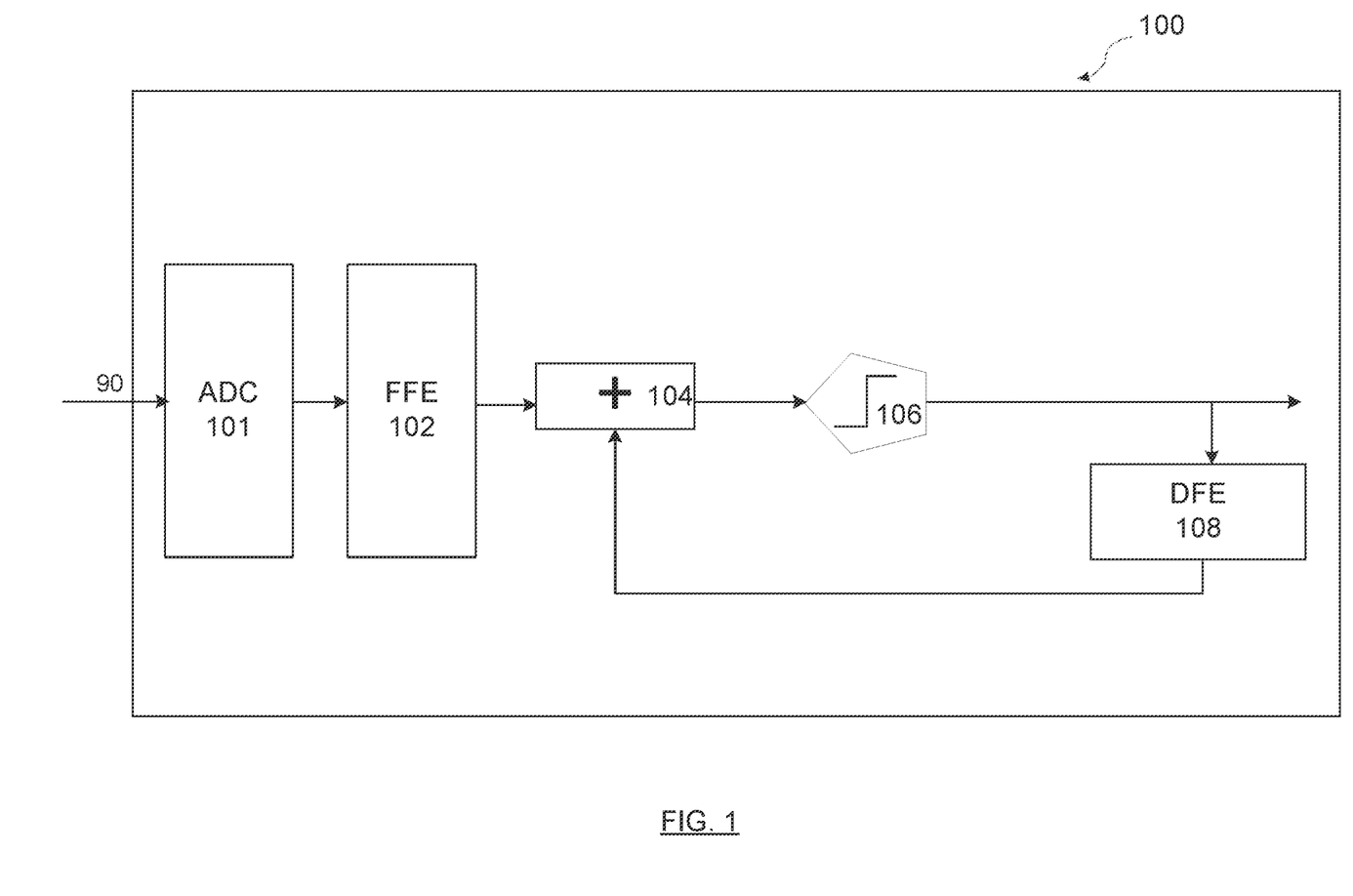
FIG. 1 is a system diagram of a receiver for equalizing a signal.

FIG. 1 illustrates a system diagram of a receiver 100 for equalizing an analog signal 90. When the analog signal 90 is transmitted to the receiver 100 via a channel, Inter Symbol Interference (ISI) may occur due to various conditions of the channel.

The received signal 90 may be converted to digital signals or samples at an Analog to Digital converter (ADC) 101. In some examples, the digital signal may be equalized in an equalizer at the ADC 101. The digital signal or samples output from the ADC 101 may be equalized in an equalizer, such as FFE 102 and DFE 108, for reducing ISI and recovery of the transmitted digital signals. The equalizer 102 or 108 includes one or more delay lines each delay line shifts the phase of an input signal and generates a weighted sample of the signal by multiplying the a sample with a tap. The taps are generated by a cascade of flip-flops clocked at the bit rate.

As illustrated in the example of FIG. 1, a typical digital SerDes receiver 100 may use a low speed parallel Feed Forward Equalizer (FFE) 102 and a Decision Feedback Equalizer (DFE) 108 to remove ISI from the samples driven out by a time interleaved ADC 101. Decision device 106, such as a slicer or comparator, based on an input threshold, generates data decision corresponding to input sample generate estimate of transmitted signal. The data decision is fed back to DFE 108. The DFE 108 generates a feedback signal based on an estimate ISI.

DFE 108 is a filter that uses feedback of detected symbols to produce an estimate of the channel output. The DFE 108 is fed with detected symbols and produces an output which typically is subtracted at from the output of the FFE 102. The DFE 108 contains an estimate of the impulse response of the channel. Both FFE 102 and DFE 108 correct post-cursors by shifting phase of the input digital signal applying tap weight to corrections in ratios.

The FFE 102 comprises a synchronously spaced tapped delay line with linear taps, in which the equalizing taps can occur either before or after the main tap. DFE 108 comprises a synchronously spaced tapped delay line with linear taps, driven by the detected data. Combination of FFE 102 and DFE 108 minimizes the ISI and improve channel performance.

An equalizer, such as an FFE 102, removes the ISI from the samples driven out by a time interleaved ADC 101 as follows:

$$ffe_{out[n]} = \left( \sum_{j=0}^{L-1} c_j \cdot x'[n-j] \right) \quad \text{(Equation 2.1)}$$

where:
$c_j$ are coefficients or taps of the equalizer;
$x'[n]$ are the ADC samples;
n is an integer; and
L is the number of FFE taps. $L = L_{pre} + 1 + L_{post}$; $L_{pre}$ are the number of taps before the main cursor, $L_{post}$ are the number of taps after the main cursor.

An equalizer, such as a DFE 108, removes the ISI from the samples using the formula as follows:

$$u[n] = ffe\_out[n] - \sum_{j=1}^{L_{dfe}} d_j \cdot a[n-j] \quad \text{(Equation 2.2)}$$

where:
$d_j$ are the DFE coefficients or taps;
$a[n]$ are the sliced symbols; and
$L_{dfe}$ is the number of DFE taps which are post-cursors.

An equalizer, such as FFE 102, DFE 108 and the equalizer in the ADC 101, may be used to reduce the ISI using Equation (2.1) for FFE 102 and Equation (2.2) for DFE 108 above. In formulas (2.1) and (2.2), $c_j$ and $d_j$ are taps or cursors of the equalizer.

Figure 2:
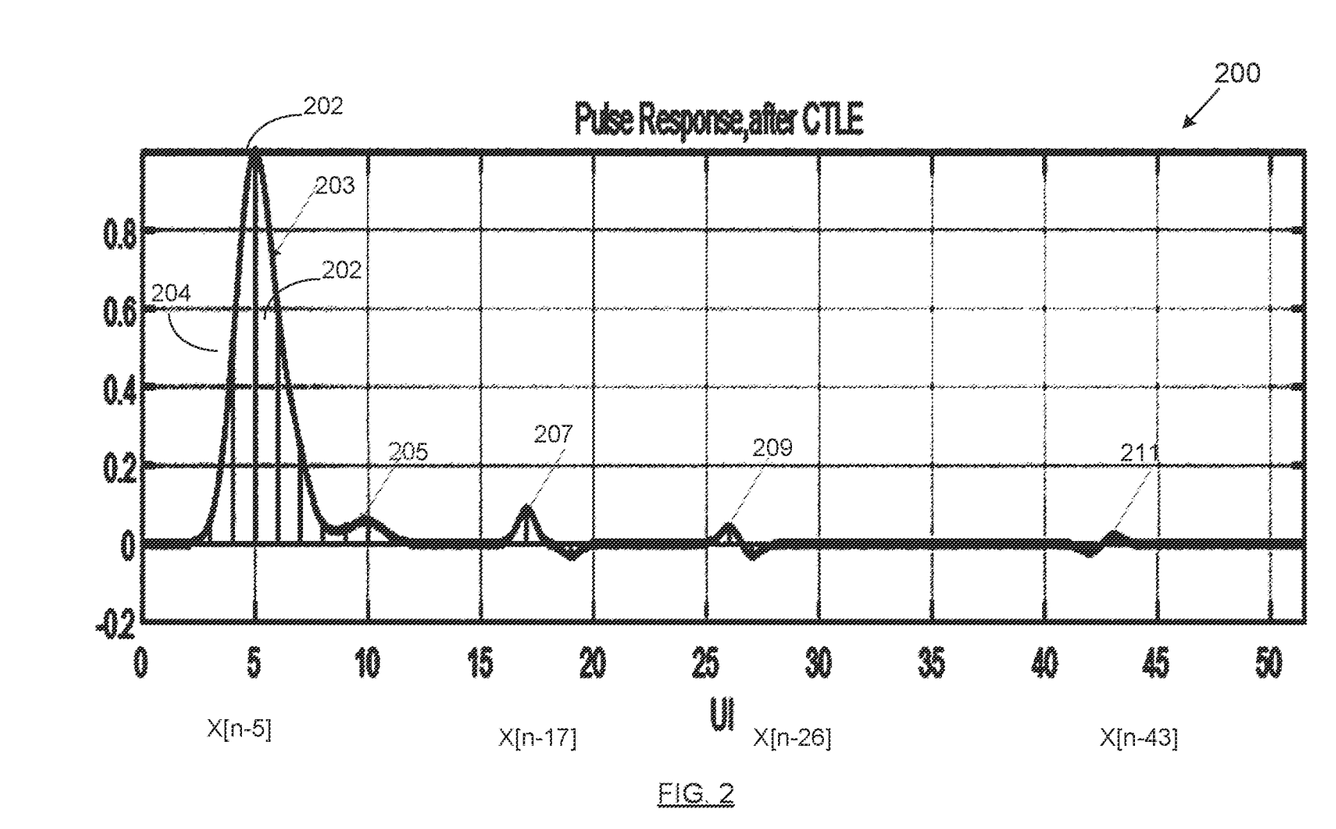
FIG. 2 is a diagram illustrating a channel response of the signal in FIG. 1.

FIG. 2 illustrates a typical pulse response 200 of a digital signal in time domain after the digital signal is received from a channel. As illustrated in FIG. 2, the response 200 may span a plurality of unit intervals (UIs), such as over 50 UIs. Each UI is a unit of time. The response 200 may include a primary response 203 and a plurality of reflection responses or reflection responses 205, 207, 209 and 211. In response 200, the primary response 203 has the highest peak of amplitude in response 200, and the peak of the primary response 203 has a higher amplitude than the peak of each reflection 205, 207, 209 or 211. The primary response 203 includes greater signal energy than each of reflection responses 205, 207, 209 and 211. Reflection responses 205, 207, 209 and 211 become ISI to adjacent bits or symbols by extending into the time domain of adjacent bits or symbols.

In the example of FIG. 2, the primary response 203 and reflection 205 overlap with each other, and can span about 15 UIs (UI 0-14). Each reflection 207, 209 and 211 can span about 5 UIs. The remaining taps such as UI 20-25, 30-40, and 45-50 are small enough and can be neglected when the samples of the channel response 200 are equalized by an equalizer.

As denoted in Equation (2.1), the response 200 includes a plurality samples X [n−j], where j=0 . . . L−1, of a symbol X[n] output from the ADC 101, n=0, and L=52. Each of primary response 203 and reflection responses 205, 207, 209 and 211 comprises comprising a first plurality of samples. For example, primary response 203 may include samples X[0]-X[−9], and reflection responses 205, 207, 209 and 211 may include samples X[−9]-X[−14], X[−15]-X[−19], X[−26]-X[−29], X[−41]-X[−44], respectively. In some examples, the boundary of primary response 203 and reflection responses 205, 207, 209 and 211 may be shifted to cover the UIs corresponding to samples with non-zero amplitude with limited samples with zero-amplitude at both ends of the primary response 203 and reflection responses 207, 209, and 211. For example, the primary response 203 may include samples X [0]-X [−14], and reflection responses 207, 209 and 211 may include X [−15]-X [−19], X [−26]-X [−29], and X [−41]-X [−44], respectively.

Similarly, the response 200 may similarly apply to the sliced symbols a [n−j] in Equation (2.2), where n=0 and j=1 . . . $L_{dfe}$.

As illustrated in FIG. 2, the main cursor or tap 202 equalizes sample X [n−5] at the UI=5. The sample X [n−5] is the peak of primary response 203 and is also the sample with the highest amplitude in response 200. The sample X [n−17] is the peak of reflection 207 with the highest amplitude in reflection 207. The sample X [n−26] is the peak of reflection 209 with the highest amplitude in reflection 209. The sample X [n−43] is the peak of reflection 211 with the highest amplitude in reflection 211. As can be seen in FIG. 2, the sample X [n−5] has a greater amplitude than any of the peaks of reflection responses 207, 209 and 211.

The taps for equaling the samples of the response 200 may include pre-taps, main tap, and post-taps. In the example of FIG. 2, the taps for equalizing the samples prior to the main cursor 202, on the left side of the main tap 202, are pre-cursors or pre-taps, such as pre-tap 204. On the other hand, taps for equalizing the samples of the response 200 after the main tap 202 on the right side of the main tap 202, are post-cursors or post-taps, such as post-tap 205. In the example of FIG. 2, each tap corresponds to a sample at a specific UI. For example, main cursor 202 corresponds to sample X [n−5], post-cursor 205 corresponds to sample X[n−9] and pre-tap 204 corresponds to sample X[n−4].

Figure 3:
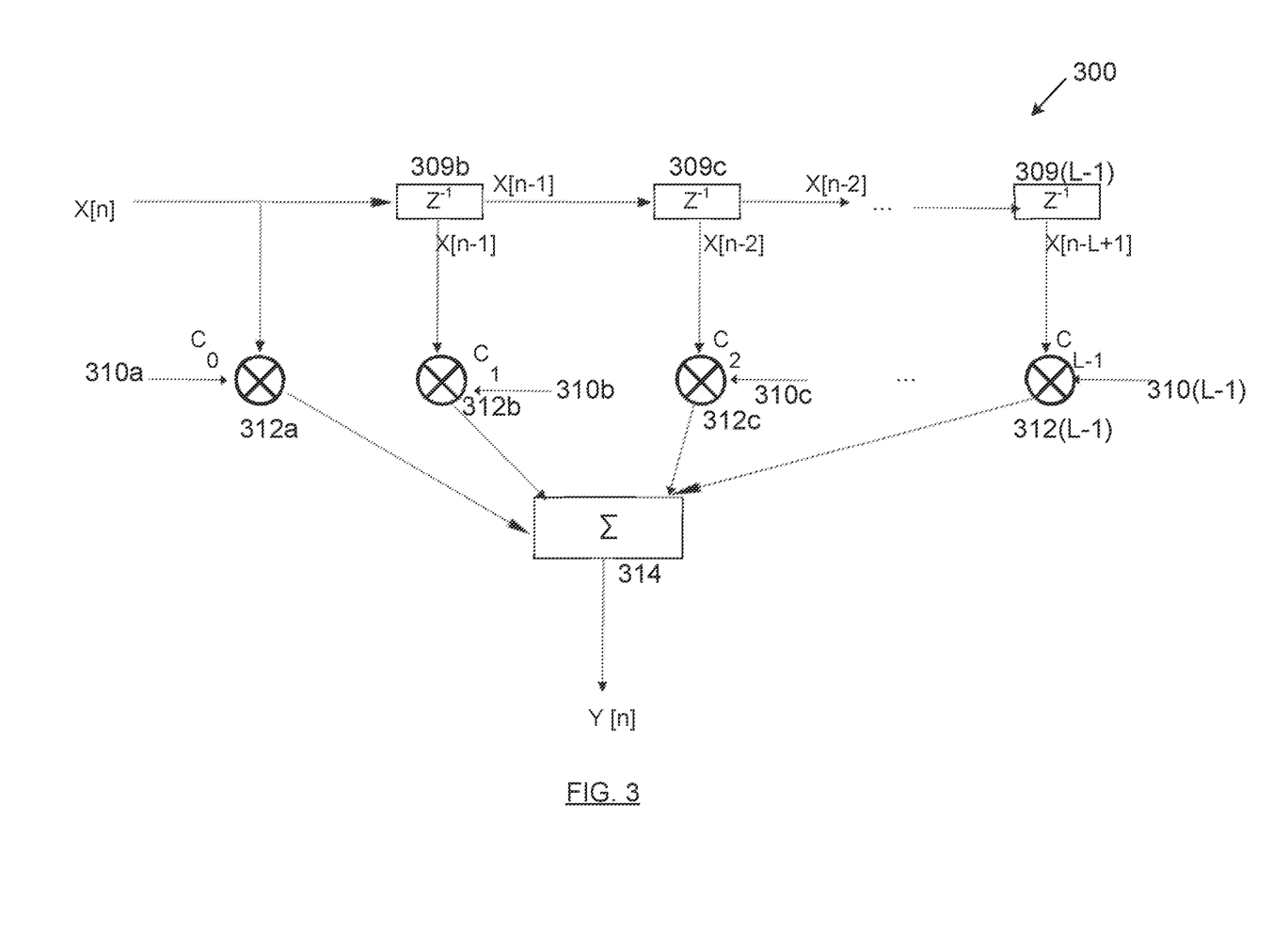
FIG. 3 is a diagram illustrating an exemplary structure of an equalizer.
Figure 7:
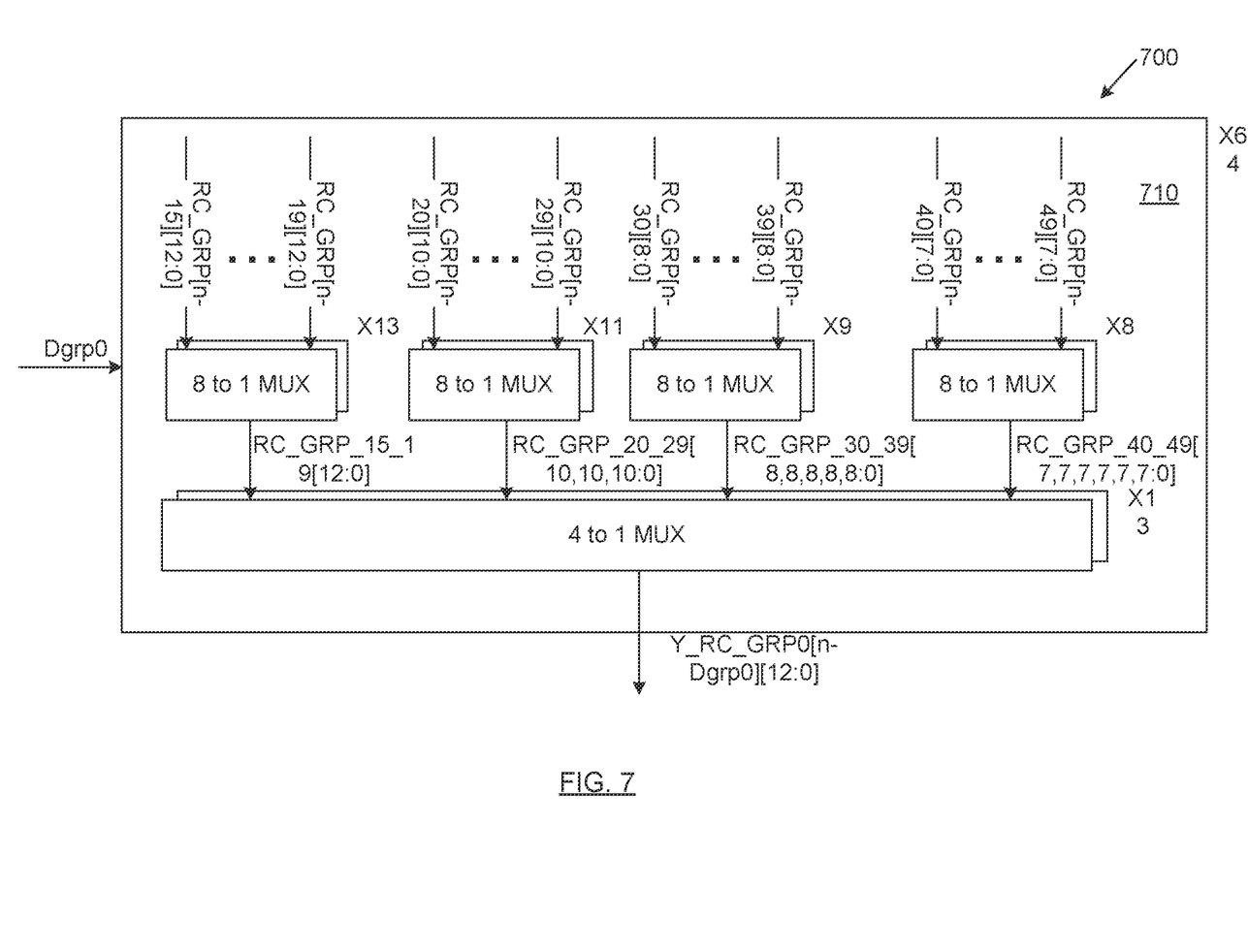
FIG. 7 is a diagram illustrating an exemplary structure of a parallel equalizer, implementing the process of FIG. 6.
Figure 8:
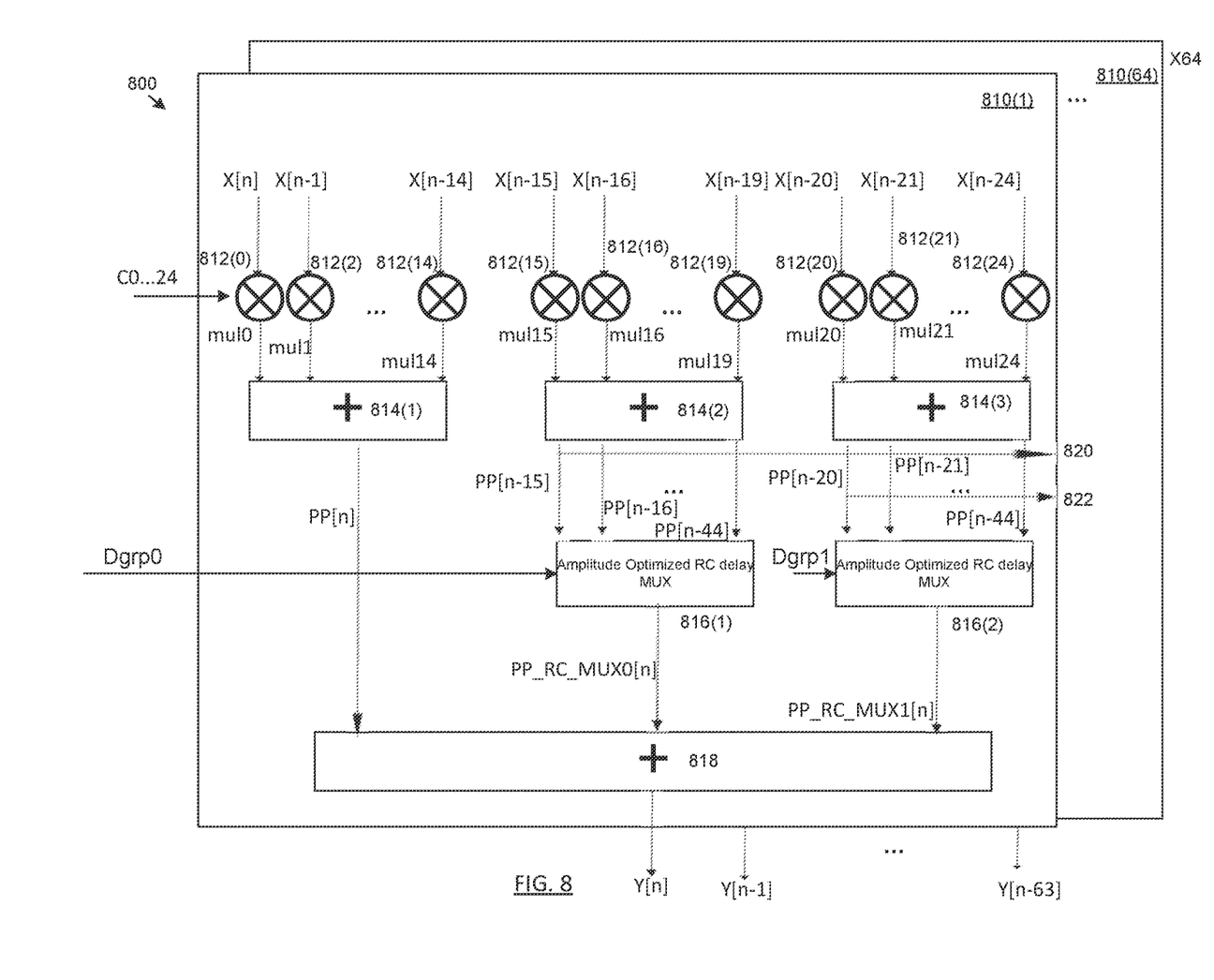
FIG. 8 is a diagram illustrating an exemplary structure of a parallel equalizer, according to an example embodiment.

FIG. 3 illustrates an example of an equalizer 300 of an L-tap delay line. The equalizer 300 may include one or more delays 309b-309(L−1), a plurality of multipliers 312a-312(L−1), a plurality of flip-flops 310a-310(L−1), and one or more adders 314. The delays 309b-309(L−1) may be arranged in series. Each delay line 309b-309(L−1) is configured to delay an input sample to a unit of time or a unit interval, or to delay a partial product, as will be described below, to a unit of time or a unit interval. Each multiplier of 312a-312(L−1) is configured to multiply a sample or a delayed sample with a tap 310a, 310b, 310c . . . or 310(L−1) to generate a weighted result. Each tap input of 310a-310(L−1) is configured to generate a respective tap $C_0$ to $C_{L-1}$ for equalizing a sample. FIG. 3 shows an example with one adder 314. The adder 314 is configured to add up the weighted results output from the multipliers 312a-312(L−1). In some examples, the samples may be processed by sections, as illustrated in FIGS. 7 and 8. In the examples of FIGS. 7 and 8, which will be described in detail below, an equalizer may also include two or more adders, some adders are configured to add samples or processed results of samples to general partial results, and one adder is configured to add up all of partial results to generate a final result.

The equalizer 300 may be an example of FFE 102 or DFE 108, or an equalizer in the ADC 101. As well, the equalizer 300 may be implemented in a digital signal processor (DSP). In the example of FIG. 3, equalizer 300 equalizes an input sample X [n] of a digital signal and output an equalized results Y [n]. The equalizer 300 includes a series of delays 309b-309(L−1) and multiplier 312a, 312b, 312c, and 312 (L−1), and an adder 314. Each delay 309b-309(L−1) delays the sample X [n] by one UI. Each of the flip-flops 310a, 310b, 310c, and 310(L−1) is configured to generate a tap $C_0$, $C_1$, . . . and $C_{L-1}$ for the samples X[n], X[n−1], X[n−2], . . . and X[n−L+1], respectively, at the bit rate of the digital signal. $C_0$ is a pre-tap, $C_1$ is the main tap, $C_2$ . . . and $C_{L-1}$ are post-taps.

In FIG. 3, the multiplied products $C_0$*X [n], $C_1$*X [n−1], $C_2$*X [n−2] and $C_{L-1}$*X [n−L+1] are added up at the adder 314 to generate an equalized sample Y [n].

Figure 4:
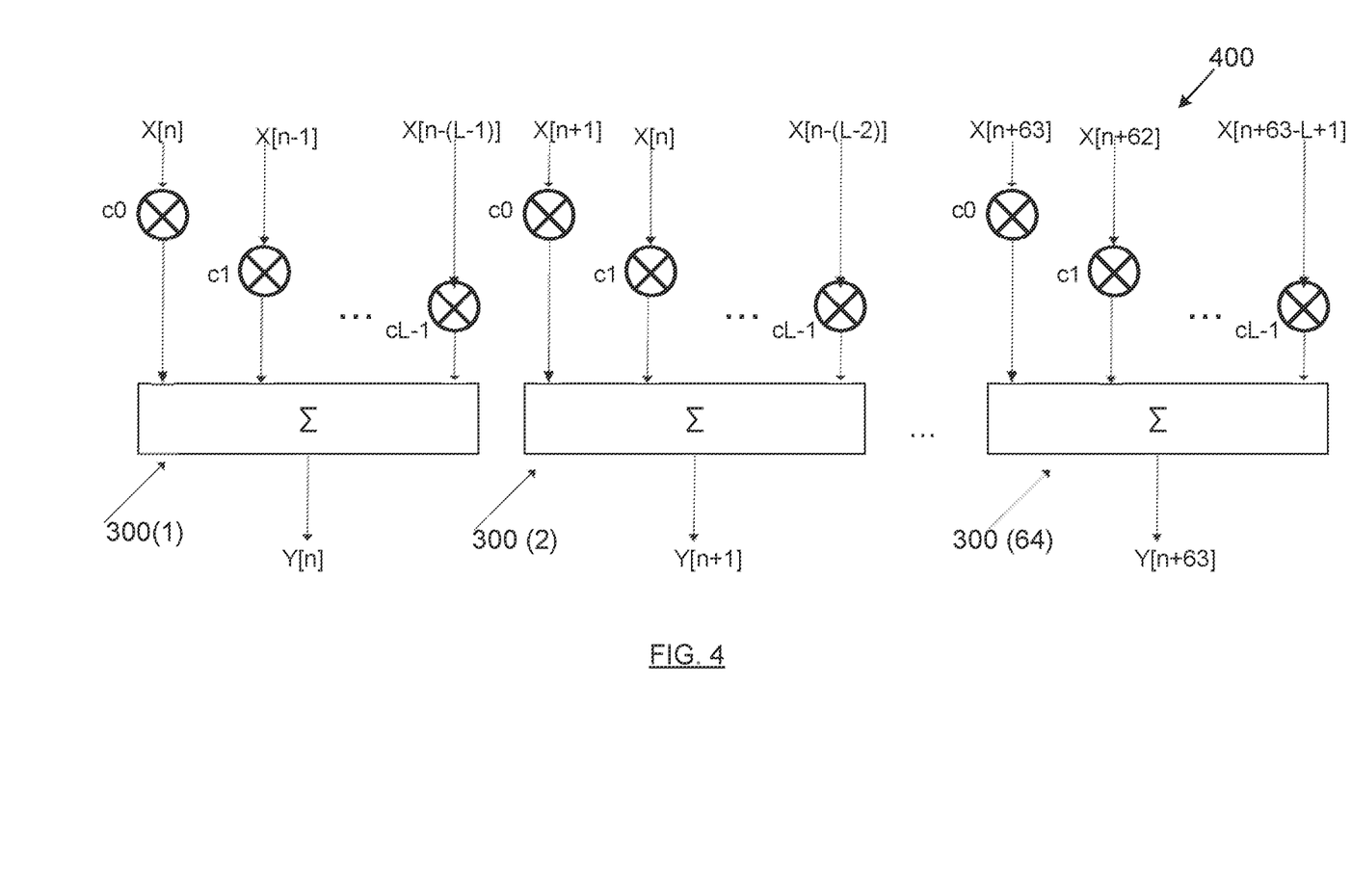
FIG. 4 is a diagram illustrating an exemplary parallel equalizer comprising 64 equalizers of FIG. 3.

As well, multiple samples from the ADC 101, such as 32, 64, or 128 samples, may be processed in parallel in a parallel equalizer to achieve a high throughput. FIG. 4 illustrates an example of a parallel equalizer 400. The equalizer 400 includes 64 L-tap delay line equalizers 300, each having L taps $c_0, c_1 \ldots c_{L-1}$.

The equalizer 400 is configured to receive 64 samples X [n] to X [n+63] from the ADC 101 and generating 64 equalized samples Y [n]-Y [n+63] of the received 64 samples. In the example of FIG. 4, samples are ordered from X [n] to X [n+63] by time. X [n] is the oldest sample by time. X [n−1], X [n−2] . . . X [n−(L−1)] are ADC samples sampled again with a flip flop from previous cycle needed for the calculation of equalizer 400 taps $C_0$ to $C_{L-1}$. X[n−1], X[n−2] . . . X[n−(L−1)] are equal to X_D1[n+63:n+63-L+1] from samples X[n+63-L+1] to X[n+63], where X_D1 is a delayed by 1 cycle version of X. Each equalizer 300 receives L values of X bus, shifting by 1 sample up, when compared with the equalizer 300 on the left. For example, equalizer 300(1) receives samples X [n]-X [n−(L−1)], and equalizer 300(2) receives samples X [n+1]-X [n−(L−1)+1], shifted by 1 sample up in relation to equalizer 300(1).

As illustrated in FIG. 2, the delay line of the equalizer 300 may need to span several tens of UIs in order to cover all or substantial portions of the significant ISI components in the target channels. As illustrated in FIG. 4, covering a span of multiple tens of UIs with a parallel equalizer 400 of a received digital signal requires significant cell area. The cell area may include, for example, multipliers, adders and flip-flops. The cell area may also include multiplexer cell area when a multiplexer is used in connection with roaming taps. As well, as illustrated in the examples of FIGS. 3 and 4, in a process of equalizing samples, a multiplier is used for multiplying a sample with a tap to generate a weighted result. In the example of FIG. 4, each equalizer 300 uses L multipliers, and 64 equalizers use 64*L multipliers. When the span covered is wide, the area and power consumption of the equalizer delay line can be of concern.

In some examples, the delay line required to cover the reflection responses in a typical channel response 200 in FIG. 2 can be applied to the partial product with fewer taps, this allows to save the number of multipliers.

Equation (2.3) below defines equalizing samples of a selected reflection group spans from UIs in the range of A to B:

$$RC_{grp\_i}[n] = \sum_{k=fixed\_delay+grp\_i\_delay}^{fixed\_delay+grp\_i\_delay+grp\_i\_span-1} c_k * X[n-k] \quad \text{(Equation 2.3)}$$

$$RC_{grp\_i}[n] = \sum_{k=fixed\_delay+grp\_i\_delay}^{fixed\_delay+grp\_i\_delay+grp\_i\_span-1} c_k + X[n-k]$$

where:
fixed_delay is the number of fixed taps
grp_i_delay is the tunable delay of group i, spanning in the range [A, B] where A, B are arbitrary
grp_i_span is the number of taps in group i RC refers to reflection cancellation. With Equation (2.3), samples within the selected UI range from A to B may be equalized by taps $C_k$, k=fixed_delay+grp_i_delay to fixed_delay+grp_i_delay+grp_i_span−1. As such, the equalization process does not need to be continuous and this reduces the overall cell area. The range [A, B] may be determined by simulation.

For each added UI to grp_i_delay, implementing equation (2.3) by delaying the ADC samples needs grp_i_span*X_width of multiplexers. X_width is the bit-width of an ADC sample. For example, if grp_i_span is 5 taps/group and X_width is 7 bits, for each added UI to grp_i_delay, the multipliers inputs is selected from a wire range extended by 35 wires, and thus the additional multiplexer is 35.

In some examples, an equalizer may first determine the sum $RC_{grp\_i}[n]$ without delay on the sample input X. The equalizer may then delay the sum $RC_{grp\_i}[n]$. In the example in equation 2.4 below, 64 results of the partial product sum are calculated with a fixed delay on the input, set by 1. In the example in equation 2.4.1 below, the partial product sum are delayed by grp_i_delay.

$$RC_{grp\_i}[n] \xrightarrow{n=m*64+l} RC_{grp\_i}[m, l] = \quad \text{(Equation 2.4)}$$

$$\sum_{k=fixed_{delay}}^{fixed_{delay}+grp_{span}-1} c_k * X[m*64+l-k];$$

$$l = 0 \ldots 63$$

m is an integer, K is the number of taps.

$$RC\_DLY_{grp\_i}[n]=RC_{grp\_i}[n-grp\_i\_\text{delay}] \quad \text{(Equation 2.4.1)}$$

Adaptation will have to converge the coefficients to be the same as those in the samples delay above. When one additional UI is added to grp_i_delay in equation 2.4.1, additional multiplexers of one UI delayed version of $RC_{grp\_i}$ [n] are needed. Hence, the additional multiplexers required are a function of its bitwidth of the samples. For C resolution of 6 bits, the 2's complement multiplication resolution of C*X (ignoring max negative value for both) will be 12 bits. Analysis of the reflections 207, 209 and 211 in FIG. 2 shows that the sum of 5 taps in a group will not increase the resolution by more than 1 bit, so total multiplexers are 13.

The number of groups required may be set by the number of reflection responses to be cancelled by an equalizer. For example, an equalizer may include 15 fixed taps for 8 bits resolution, including 5 pre tap, main tap and 9 post taps, covering UIs from 1-9, and 10 roaming taps for 6 bits resolution, covering the span of 10 UIs to 20 UIs without extra delay added. The fixed taps are used for equalizing the primary response 203, and the roaming taps are used for equalizing reflection responses 207, 209, and 211 for equalizing reflection responses with up to 50 UI delay or more from the main cursor. Roaming taps are fewer than the fixed taps. As such, fewer number of multipliers are used in the equalizing the samples.

In certain advanced technologies, such as 7 nm technology, the area of a single FFE with these parameters is 515 $\mu m^2$, and the area of 64 parallel FFEs is 33 k $\mu m^2$. Each roaming group will cover: UI_SPAN–GRP_SIZE+1, represented by a number s, sample inputs. For example, 2-to-1 multiplexer cell area can be used to evaluate the total area required by multiplexers of an equalizer with reflection cancellation features. The cell area of a 2-to-1 multiplexer is 0.15 $\mu m^2$. Other multiplexer cells may also be used to estimate the size of an equalizer.

To multiplex s inputs with 2-to-1 multiplexers, s multiplexers are needed: First, every two (2) inputs out of s sample inputs are multiplexed, with s/2 multiplexers, and left with s/2 results. Then every two (2) inputs out of s/2 results are is multiplexed, with s/4 multiplexers, and left with s/4 results, and so forth, until the last selection is using a single multiplexer. The total number of the multiplexers in the equalizer is:

$$S_{mux} = \frac{s}{2} + \frac{s}{4} + \frac{s}{8} + \ldots + 1 = s - 1 \xrightarrow{large\ s} s \quad \text{(Equation 2.5)}$$

where s is the number of multiplexers per bit per group.

As such, the total number of multiplexers in an equalizer is s*bit_width*grp #, where bit_width is the bitwidth of the ADC samples and grp #is the number of groups of samples of the channel response 200 to be equalized or the number of reflections to be cancelled by the reflection cancellation feature of the equalizer.

Tables 1 and 2 below show the area impact of added multiplexers. In the example shown in Table 1, an equalizer in the example of FFE spans 20, 30 and 40 UIs, or 10, 20, 30 UIs more than the span covered by the built-in 10 UIs. The equalizer includes 2 reflection cancellation groups each for cancelling a single reflection. Each group has 3 taps or roaming taps and covers full the span of the group. The area impact of the RC multiplexers are listed in Table 1 below:

TABLE 1

Example of multiplexer area with fixed group bitwidth

| RCSPAN | 10 - base FFE | 10->20 (+10) | 10->30 1(+20) | 10->40 (+30) |
|---|---|---|---|---|
| Effective SPAN |  | 8 | 18 | 28 |
| Reflection group size | N/A | 3 | 3 | 3 |
| #Groups | N/A | 2 | 2 | 2 |
| Group bitwidth | 13 | 13 | 13 | 13 |
| Single FFE ** added mux # | N/A | 208 | 468 | 728 |
| Single FFE area [squm] | 515.6 | 546.8 | 617.0 | 726.2 |
| Total FFE area [Ksqum] | 33 | 35.0 | 39.5 | 46.5 |
| Area increase [%] | 0 | 6.1 | 19.7 | 40.8 |

In Table 1, effective span refers to the locations to be covered by the equalizer. Effective span is determined by UI_SPAN-GRP_SIZE+1. For example, from UI 10 to 20, an equalizer needs to cover 8 locations: (UI 10 to 12, 11 to 13, 12 to 14, 13 to 15, 14 to 16, 15 to 17, 16 to 18, 17 to 19)=10(UI_SPAN)–3 (GRP_SIZE)+1=8. The number of the multiplexers of a parallel equalizer is proportional to the number of the multiplexers of a single equalizer. For example, a parallel equalizer comprising 64 single equalizers has 64 times of the number of the multiplexers of a single equalizer.

In the example of Table 2, the equalizer in the example of FFE spans 20, 30, and 40 UIs, or 10, 20, 30 UIs more than the span covered by the built-in 10 UIs. The equalizer includes 3 reflection cancellation groups each for cancelling a reflection, and each group has 4 taps and covers full the span of the group. Table 2 summarizes the area impact of the multiplexers of the equalizer:

TABLE 2

Example of multiplexer area with fixed group bitwidth

| RCSPAN | 10 - base FFE | 10->20* | 10->30 (+20) | 10->40 (+30) |
|---|---|---|---|---|
| Effective SPAN |  | 7 | 17 | 27 |
| Reflection group size | N/A | 4 | 4 | 4 |
| #Groups | N/A | 3 | 3 | 3 |
| Group bitwidth | 13 | 13 | 13 | 13 |
| Single FFE** added mux # | N/A | 273 | 663 | 1053 |
| Single FFE area [squm] | 515.6 | 556.6 | 615.1 | 673.6 |
| Total FFE area [Ksqum] | 33 | 35.6 | 39.4 | 43.1 |
| Area increase [%] | 0 | 7.9 | 19.3 | 30.6 |

Similar to Table 1, the effective span from 10 to 20 UIs is 7, covering 7 locations: 10 (UI_SPAN)–4(GRP_SIZE)+1=7. In both Table 1 and Table 2, the added multiplexer number for a single equalizer=reflect group size*number of groups*group bitwidth, single equalizer area=total equalizer area/64*1000+added multiplexer number for a single equalizer (in UI 10→20, 10→30, or 10→40)*area of an multiplexer, and the area increase is with respect to the area of 10 base UIs.

As shown in tables 1 and 2, increase in UI_SPAN increases effective span, and increase in effective span of an equalizer can result in significant increase of the number of multiplexers. This in turn increases the area of the equalizer. Area increase also results in power increase.

Figure 5:
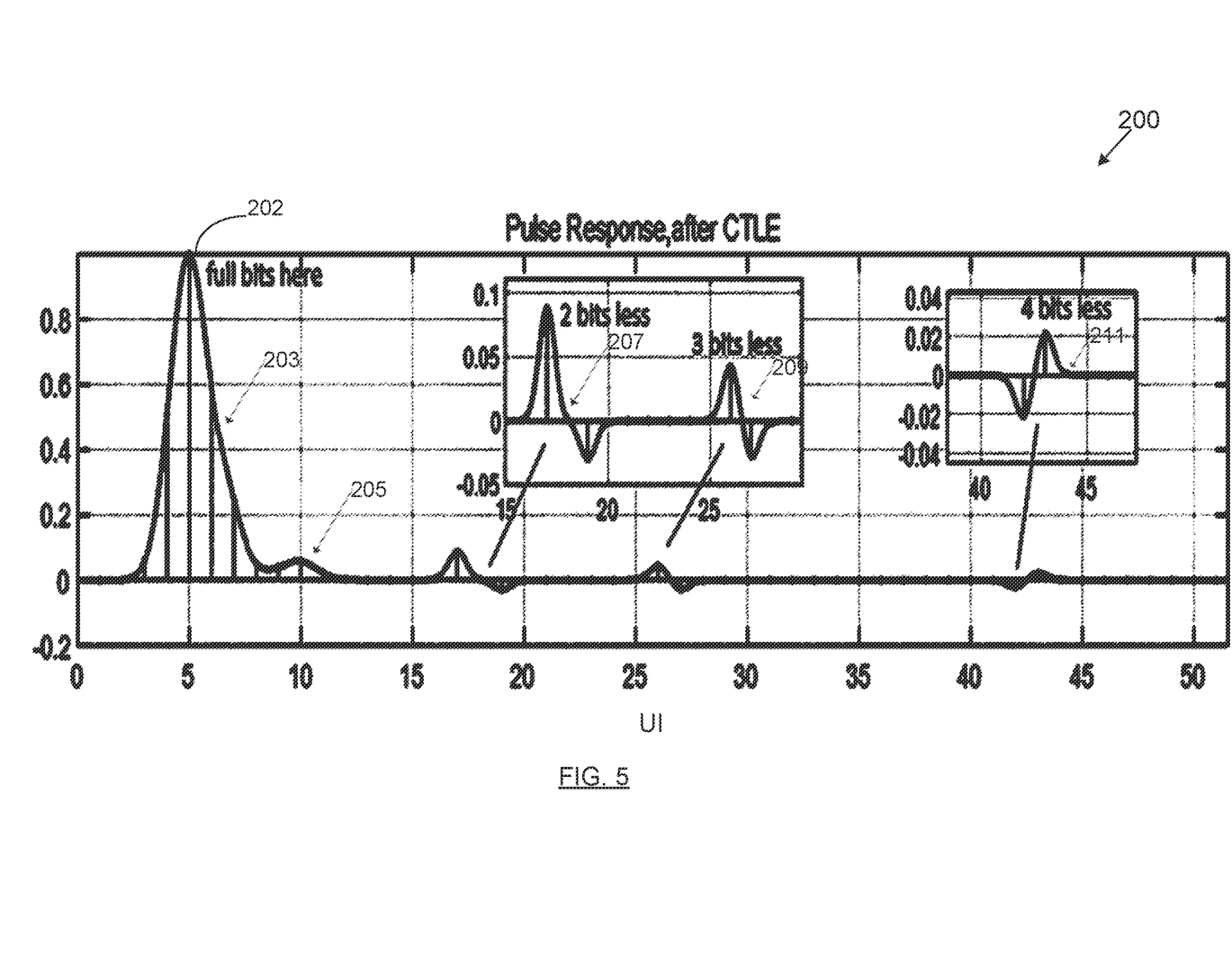
FIG. 5 is a diagram illustrating different bitwidths used to represent different portions of the channel response of FIG. 2.

As illustrated in FIGS. 2 and 5, in a typical communication channel, amplitudes of reflection responses 205, 207, 209 and 211 are attenuated as the delay from the main cursor 202 increases. As well, the peak amplitude of a reflection closer to the main cursor 202 is generally greater than that of a reflection farther away from the man cursor 202. For example, reflection 207 generally has a greater peak amplitude than reflection 209 or reflection 211.

The difference in the amplitudes of the reflection responses 207, 209 and 211 also reflects the number of bits needed for adequately presenting reflection responses 205, 207, 209 and 211 and the primary response 203. In the example of FIG. 5, based on simulation results, due to the attenuated amplitudes, to adequately represent the reflection responses 207, 209 and 211, each reflection needs fewer number of bits than the primary response 203. In the example of FIG. 5, a simulation result shows that reflection responses 207, 209 and 211 are 2 bits, 3 bits, and 4 bits fewer than the primary response 203, respectively. In the example of FIG. 5, the reflection 205 is in close proximity to the primary response 203 and can be considered as a portion of the primary response 203 in equalizing the sample of the channel response 200.

As such, when an equalizer equalizes the samples of a digital signal, rather than using the same bitwidth for equalizing the reflection responses and the primary response, the equalizer may equalize the samples of the reflection responses using a shorter bitwidth, and equalize the primary response using a longer bitwidth. In some examples, an equalizer may be configured to divide samples of a digital signal to a plurality of sections, each section may represent the primary response or one of the reflection responses, and each section may use one bitwidth. Each reflection is represented by a bitwidth shorter than the bitwidth representing the primary response. The bitwidth that suffices to represent a specific section may be determined by simulation. Since the number of multiplexer cells of an equalizer is proportional to the number of the bitwidth as discussed above, such as UI_SPAN*BITWIDTH, by using one or more shorter bitwidths to represent the reflection responses, the number of the multiplexers of an equalizer may be reduced. Accordingly, the delay line multiplexer area and power penalty of such equalizer can be reduced.

Figure 6:
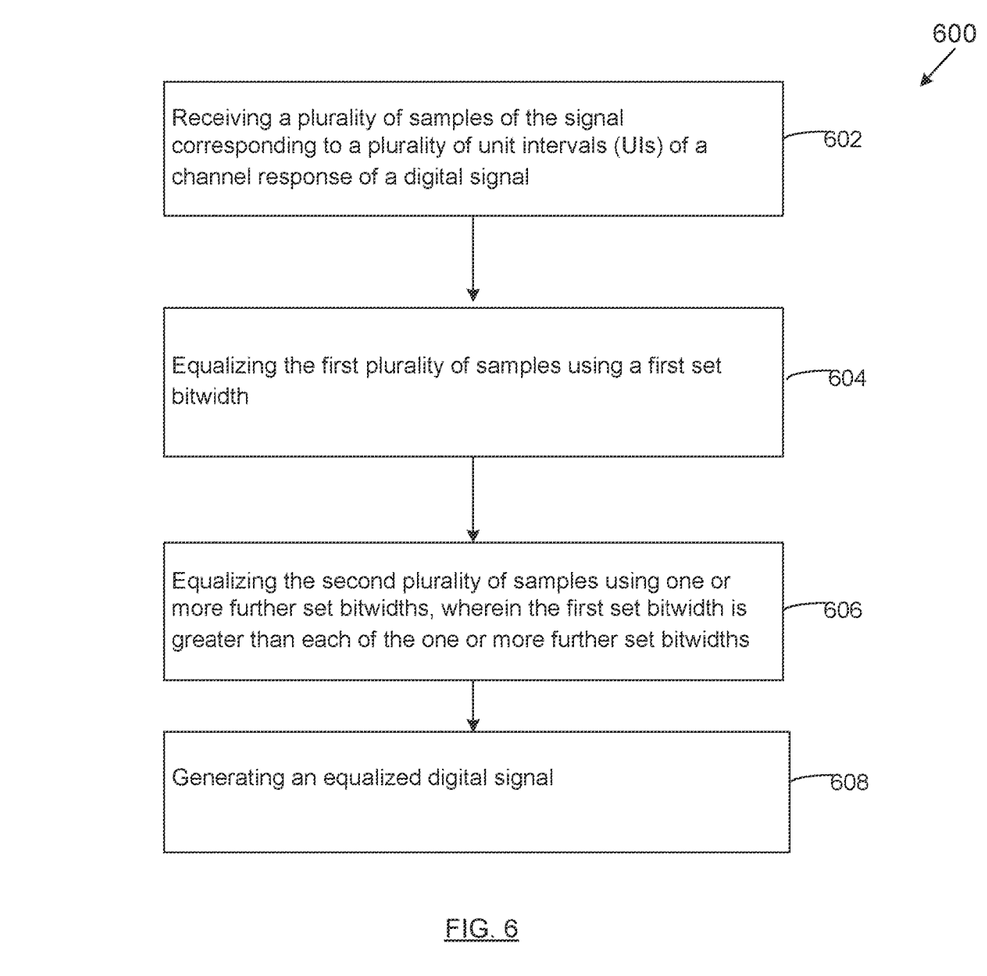
FIG. 6 is a flow chart illustrating a signal equalization process, according to an example embodiment.

In an example, FIG. 6 is a flow chart illustrating a method 600 for equalizing a digital signal at an equalizer 300. At step 602, the equalizer 300 may be configured to receive a plurality of samples of the digital signal corresponding to a plurality of UIs of a channel response of the digital signal, the plurality samples comprising a first plurality of samples of a primary response and a second plurality of samples of one or more reflection responses. The plurality of samples may be received by the delays or the multiplexers. For example, the equalizer 300 may select a plurality of samples X[n]-X[n−49] in FIGS. 2 and 5, of the digital signal corresponding to UIs 0-49 in FIGS. 2 and 5, of a channel response 200. The first plurality of samples may be X [n]-X [n−14] in FIGS. 2 and 5 for primary response 203 and the second plurality of samples may be samples X [n−15]-X [n−19], X [n−20]-X [n−29], X [n−30]-X [n−49] in FIGS. 2 and 5 for one or more reflection responses 207, 209, or 211, respectively. As described above, the primary response 203 includes the highest peak of amplitude in response 200, and the peak of the primary response 203 has a higher amplitude than the peak of each reflection 205, 207, 209 or 211. The primary response may include reflection responses overlapping with the primary response, such as reflection 205 in FIGS. 2 and 5. The first plurality of samples may include all non-zero amplitude samples of the primary response. The first plurality of samples may also include one or more zero amplitude samples at each end of the primary response. The second plurality of samples may include all non-zero amplitude samples of the reflection responses. The second plurality of samples may include one or more zero amplitude samples at each end of each of the one or more reflection responses. In some examples, each of the second plurality of samples has an amplitude greater than or equal to a predetermined threshold, such as 0, 0.001, or 0.01, etc.

The UIs of the corresponding primary response and one or more reflection responses may form a continuous UI span of the channel response 200. In some examples, the UIs of corresponding primary response and one or more reflection responses may comprising discrete respective UI spans in the channel response 200, namely that some UIs in the channel response 200 may be excluded from the UI spans of primary response and one or more reflection responses. In the example of FIG. 5, some samples such as at UI 20-25, 30-40, 45-50 have their amplitudes close to zero and can be neglected when the samples of the channel response 200 are equalized by the equalizer 300. In this regard, a multiplexer is used to select non-zero amplitude UI span. As such, the multiplexer allows to select a reduced set of samples and corresponding multipliers. Accordingly, the multipliers that would have been used for the portions of the channel response that is close to zero amplitude, can be saved.

In some examples, the plurality of UIs may be configured to be divided into a primary response UI section and one or more reflection response UI sections subsequent to the primary response UI section in time, and the primary response UI section comprises the first plurality of samples and one or more reflection response UI sections comprising the second plurality of samples. For example, the primary response UI section may be UIs 0-14 in FIGS. 2 and 5, and one or more reflection response UI sections may be UIs 15-19, 20-29, and 30-51 in FIGS. 2 and 5. The primary response UI section UIs 0-14 comprises the first plurality of samples X [n]-X [n−14], and one or more reflection response UI sections 15-19, 20-29, and 30-51 comprises the second plurality of samples X [n−15]-X [n−19], X [n−20]-X [n−29], X [n−30]-X [n−51].

In some examples, the total UI spans of a channel response 200 of a digital signal may be defined as follows:

$$s = s_{bw\_sect0} + s_{bw\_sect1} + s_{bw\_sect2} + \ldots + s_{bw\_sect\_n} \quad \text{(Equation 3.1)}$$

where $s_{bw\_sect0, 1 \ldots n}$ are sections of UI spans of a digital signal. Each section of $s_{bw\_sect0, 1 \ldots 1}$ covers a continuous subset UI span of the total UI span and each section span comprises one or more UIs. The boundary of a UI section may be determined by simulation in some examples.

Each section may be associated with a bitwidth: bitwidth 0, bitwidth 1 . . . bitwidth n, for equalizing the digital signal. Bitwidth 0, bitwidth 1 . . . bitwidth n are the number of bits representing the samples of the respective sections. For example, Bitwidth 0 is the number of bits represent the primary response 203, and bitwidth 1 . . . bitwidth n are number of bits representing the reflection responses, such as 207, 209, 211, etc. Bitwidth 0 is greater than each of bitwidth 1 . . . bitwidth n. In some examples, Bitwidth 0>bitwidth 1> . . . >bitwidth n. Bitwidth 0 is the default bitwidth used in the parallel equalizer and the bitwidth 1> . . . >bitwidth n are bitwidths with bitwidth multiplex optimization of example embodiments.

As derived in Equation 2.5, the number of 2 to 1 multiplexer cells to select between s inputs is s−1. By using an amplitude or bitwidth optimized multiplexer structure, the following amount of 2 to 1 multiplexer cells can be reduced:

$$\text{ReducedMuxCellCount} = s_{bw_{sect1}} * (bw_{sect0} - bw_{sect1}) + s_{bw_{sect2}} * (bw_{sect0} - bw_{sect2}) + \ldots + s_{bw_{sectn}} * (bw_{sect0} - bw_{sectn})$$ (Equation 3.2)

At step 604, the equalizer 300 may be configured to equalize the first plurality of samples using a first set of bitwidth. The first set of bitwidth may be used for representing the primary response section. For example, the equalizer 300 may, at the delays and the multipliers, equalize primary response section for the samples X[n]-X[n−14] with 13 bits.

At step 606, the equalizer 300 may be configured to equalize the second plurality of samples using one or more further set bitwidths. Each further set bitwidth represents one of the further reflection response sections. The first set bitwidth is greater than each of the one or more further set bitwidths. For example, the equalizer 300 may equalize primary response section for the samples X[n]-X[n−14] with 13 bits, equalize samples X[n−15]-X[n−49] with 11 bits using the equation 2.1, 2.2, 2.3 or 2.4 and 2.4.1 as described above.

In method 600, the first set bitwidth and the one or more further set bitwidths may be predetermined, for example, based on simulation results. For example, in FIG. 7, the first set bitwidth may be predetermined to be 13 bits for representing the primary response section for the samples X[0]-X[−14], and the one or more further set bitwidths may be predetermined to be 11 bits, for representing each of the reflection response section for the samples X[n−15]-X[n−49]. In some examples, each of the reflection responses 207, 209 and 211 may have different one or more further set bitwidths, such as 11 bits for samples X[n−15]-X[n−19] in the reflection response 207, 10 bits for samples X[n−20]-X[n−29] in the reflection response 209 and 9 bits for samples X[n−30]-X[n−51] in the reflection response 211. In some examples, the one or more further set bitwidths decrease as the peak amplitudes of the reflection responses 207, 209 and 211 decrease. For example, reflection 207 has a greater peak amplitude than reflection 209, and reflection 209 has a greater peak amplitude than reflection 207. Accordingly, the further set bitwidth for samples X[n−15]-X[n−19] in the reflection response 207 is 11 bits, the further set bitwidth for samples X[n−20]-X[n−29] in the reflection response 209 is 10 bits, and the further set bitwidth for samples X[n−30]-X[n−49] in the reflection response 211 is 9 bits.

At step 608, the equalizer 300 may generate an equalized digital signal for example, Y [0] at the adder 314.

The method 600 may also be applied to a parallel equalizer delay line, such as parallel equalizer 400, 700 and 800 to be described below, including an FFE partial product delay line, a ADC samples delay line, and an DFE partial products delay line.

Table 3 below shows an example using specific bitwidth for UI sections covering a total UI span of 50 UIs. In the example of Table 3, the UI span has been divided into four sections: $S_{bw\_sect0}$ covering UIs from 0-19 for samples X[n]-X[n−19], $S_{bw\_sect1}$ covering UIs from 20-29 for samples X[n−20]-X[n−29], $S_{bw\_sect2}$ covering UIs from 30-39 for samples X[n−30]-X[n−39], and $S_{bw\_sect3}$ covering UIs from 40-49 for samples X[n−40]-X[n−49]. The bitwidth characteristics or bitwidth of each UI section is selected as 13, 11, 9 and 8, as listed in Table 3 below:

TABLE 3

| | RC group bitwidth as a function of UI span | | | |
|---|---|---|---|---|
| RCSPAN | <20: $bw_{sect0}$ | 20→30: $bw_{sect1}$ | 30→40: $bw_{sect2}$ | 40→50 $bw_{sect3}$ |
| UI Section Bitwidth | $S_{bw\_sect0}$ 13 | $S_{bw\_sect1}$ 11 | $S_{bw\_sect2}$ 9 | $S_{bw\_sect3}$ 8 |

FIG. 7 is an example of a parallel equalizer 700, which includes 64 equalizers 710 or equalizer blocks. The parallel equalizer 700 applies the method 600 to equalize the samples in accordance with the exemplary bitwidth set out in Table 3.

In the example of FIG. 7, each of RC_GRP [n−15] . . . RC_GRP [n−49] are partial group sum determined according to Equation 2.4. Dgrp 0 is the delay for each group according to equation 2.4.1. The amount delay in UI may be set by using Dgrp 0 for selecting appropriate RC_GRP input. As illustrated in FIG. 7, each bitwidth group is multiplexed separately. For example, in each equalizer 710, the first sample group generating RC_GRP [n−15]-RC_GRP [n−19] are represented by 13 bits and using 13 X8 to 1 MUX for 4 inputs, RC_GRP [n−20]-RC_GRP [n−29] are represented by 11 bits, using 11×8 to 1 MUX for 10 input, RC_GRP [n−30]-RC_GRP [n−39] are represented by 9 bits using 9×8 to 1 MUX for 10 input, and RC_GRP [n−40]-RC_GRP [n−49] are represented by 8 bits using 8×8 to 1 MUX. The outputs from the 8 to 1 multiplexers are denoted with RC_GRP_15_19 [12:0], RC_GRP_20_29 [10, 10, 10:0], RC_GRP_30_39 [8, 8, 8, 8, 8:0], RC_GRP_40_49 [7, 7, 7, 7, 7, 7:0] with appropriate sign extension to yield a fixed input bitwidth to a 4 to 1 MUX, where each bit is multiplexed at the 4 to 1 Multiplexer to generate an output Y_RC_GRP0 [n−Dgrp0] [12:0] with delay Dgrp0.

The inputs to each bitwidth group are the bw_sec1 least significant bits (lsbits) of the RC partial products. Because the peak amplitudes of the reflection responses $S_{bw\_sect1}$, $S_{bw\_sect2}$, and $S_{bw\_sect3}$ are lower than the maximum amplitude of $S_{bw\_sect0}$, the dropped most significant bits (msbits) are the sign extension. The outputs of the bitwidth group multiplexer are sign extended to match the highest bitwidth, and then multiplexed with the outputs of other bit groups. The optimized multiplexer may be incorporated within each equalizer 710.

FIG. 8 illustrates a parallel equalizer 800 comprising 64 equalizers 810 for concurrently equalizing 64 samples from the ADC 101. The parallel equalizer 800 may be a parallel FFE 102 or DFE 108, or incorporate a delay line of the ADC 101. Each equalizer 810 equalizes a sample from the ADC 101 using the method 600. In FIG. 8, an equalizer 810 is configured to equalize samples of a digital signal comprising a primary response samples X[n]-X[n−14], and two groups of reflection samples X[n−15]-X[n−19], and X[n−20]-X[n−24] using equations 2.4 and 2.4.1.

In the example of FIG. 8, the primary response has 15 taps $c_0$-$c_{14}$ for samples X[n]-X[n−14] and 15 multipliers 812(0)-812(14), and each reflection response has 5 taps or roaming taps: $c_{15}$-$c_{19}$ for samples X[n−15]-X[n−19] and 5 multipliers 812(15)-812(19), and $c_{20}$-$c_{24}$ for samples X[n−20]-X[n−24] and 5 multipliers 812(20)-812(24). The samples X[n]-X[n−14] are multiplied at respective multipliers 812(0)-812(14) with respective taps $c_0$-$c_{14}$ to generate the respective multiplied products mul0-mul14, which are summed up at the adder 814(1) to generate a single partial product PP[n]. The samples X[n−15]-X[n−19] are multiplied with respective taps $c_{15}$-$c_{19}$ at respective multipliers 812(15)-812(19) to generate the respective multiplied products mul15-mul19, which are summed up at the adder 814(2) to generate partial products PP[n−15]-PP[n−44] based on equation 2.4.

As equalizer 80 is a 64 parallel equalizer, each equalizing operation is performed 64 times per cycle at equalizer 80. At 814(2) the sum of mul15 to mul19 is output as 820 from each of the parallel equalizer 810(1) to 810(64) in the bus. Therefore, the equalizer 80 has 64 outputs of 820. pp[n−15] to pp[n−44] are generated by feeding output 820 back into equalizer 810 at X[n−15]-X[n−19]. pp[n−15] is generated from the equalizer 810, pp[n−16] is the output of the equalizer 810 with the block index decremented by 1 (denoted as 810(n−1)). pp[n−17] is the output of 810 with block index decremented by 2 (810(n−2)), . . . , and pp[n−44] is the output of equalizer 810 with block index decremented by 29 (820(n−29)).

The partial products PP [n−15]-PP [n−44] are then selected by an amplitude optimized RC delay MUX 816(1) to generate delayed partial product PP_RC_MUX0 [n] based on equation 2.4.1. The MUX 816(1) may select the delay input Dgrp1, where i=0. The samples X[n−20]-X[n−24] are multiplied with respective taps $c_{20}$-$c_{24}$ at respective multipliers 812(20)-812(24) to generate the respective multiplied products mul20-mul24, which are summed up at the adder 814(3) to generate partial products PP[n−20]-PP[n−44] based on equation 2.4. The partial products PP [n−20]-PP [n−44] are then selected by an amplitude optimized RC delay MUX 816(2) to generate delayed partial product PP_RC_MUX1 [n] based on equation 2.4.1. The MUX 816(2) may select the delay input Dgrp1. The partial product PP[n], and delayed partial products PP_RC_MUX0 [n] and PP_RC_MUX1 [n] are summed up at the adder 818 to generate output Y_OUT[n] at the first equalizer 0. Similar to equalizer 810(1), equalizers 2-66 generate outputs Y [n−1]-Y [n−63].

Table 4 below shows exemplary comparison results of the number of 2 to 1 multiplexer cells of an existing equalizer equalizing samples of a digital signal using the same bitwidth and an equalizer equalizing samples of a digital signal using method 600, for equalizing one primary response and two reflection cancellation groups or to reflection responses:

TABLE 4

Area Savings of an Equalizer Using Method 600

| RCSPAN | <20*: $bw_{sect0}$ | 20→30: $bw_{sect1}$ | 30→40: $bw_{sect2}$ | 40→50 $bw_{sect3}$ |
|---|---|---|---|---|
| Optimized Bitwidth | 13 | 11 | 9 | 8 |
| Prior art muxing (same bitwidth of 13 bits): Number of cells in the section, 1 group | 78 | 130 | 130 | 130 |
| Prior art muxing (same bitwidth): Total number of cells, 2 groups | 936 | | | |
| Prior art muxing (same bitwidth): Total area [Ksqum] | 42.0 | | | |
| Bitwidth optimized muxing: Number of cells in section | 78 | 110 | 90 | 80 |
| Bitwidth optimized muxing: Total number of cells, 2 groups | 716 | | | |
| Bitwidth optimized muxing: Total area [Ksqum] | 39.9 | | | |

As illustrated in Table 4 above, in the scenario where an existing equalizer equalizing samples of a digital signal using the same bitwidth (prior art muxing), the number of cells in Sect0 are 78(78=6*13) for 6 samples X[n−15]-X[n−20], and in each of Sect1, Sect2, and Sect4 are 130 (=10*13) for 10 samples X[n−21]-X[n−30], X[n−31]-X[n−40], and X[n−41]-X[n−49], respectively. Therefore, the total number of multiplexer cells for 2 RC groups are 936(=(78+130+130+130)*2) for samples X [n−15]-X [n−49] in a single equalizer 810 block. The total area of the multiplexers at the top level of parallel equalizer 800 is 42 Ksqum(=33+936*0.15*64/1000), where 33 is the area of the equalizer with 10 base samples indicated in Tables 1 and 2.

In the scenario where an equalizer uses method 600 to equalize the samples of a digital signal, the number of cells in Sect0 is 78(=6*13) for 5 samples X[n−15]-X[n−19], and 110 (=11*10) in Sect1 for 10 samples X[n−20]-X[n−29], 90(=9*10) in Sect2 for 10 samples X[n−30]-X[n−39], and 80(=8*10) in Sect4 for 10 samples X[n−40]-X[n−49]. In this case, the total number of cells for 2 reflection responses are 716 (=(78+110+90+80)*2) in a single equalizer 810 block. The total area of the multiplexers at the top level of parallel equalizer 800 is 39.9 Ksqum(=33+716*0.15*64/1000), where 33 is the area of 15 base samples indicated in Tables 1 and 2.

In the Table 4 above, with respect to Sect0, only delays 15419 are covered, because delay 10→14 overlap with primary response 203 and covered by the primary response 203, the reflection area starts from the location where there is no overlap with the primary response. As can be seen in Table 4, an equalizer using method 600 can result in 24%(=(936−716)/936*100%) multiplexer cells saving in multiplexer area, and 5.5%(=(42−39.9)/42*100%) overall equalizer area saving over the equalizer without using method 600, under the same channel conditions.

As such, method 600 uses amplitude or bitwidth optimized multiplexing in the implementation of variable delay line to equalize samples of a digital signal. The bitwidth optimized multiplexing reduces the number of the multiplexer cells used in the equalizer. This in turn reduces the cell area of the equalizer and reduces the power consumption of the equalizer.

The method 600 may be implemented by a processor, a microprocessor, an application-specific integrated circuit (ASIC), a field-programmable gate array (FPGA), a dedicated logic circuitry, or combinations thereof. The method 600 may be stored in a memory including a volatile or non-volatile memory e.g., a flash memory, a random access memory (RAM), and/or a read-only memory (ROM). The non-transitory memory may store instructions for execution by the processor, such as to carry out method 600 or processes described in example embodiments. Examples of non-transitory computer readable media include a RAM, a ROM, an erasable programmable ROM (EPROM), an electrically erasable programmable ROM (EEPROM), a flash memory, a CD-ROM, or other portable memory storage.

Although the present example embodiments describe methods and processes with steps in a certain order, one or more steps of the methods and processes may be omitted or altered as appropriate. One or more steps may take place in an order other than that in which they are described, as appropriate.

Certain adaptations and modifications of the described embodiments can be made. Therefore, the above discussed embodiments are considered to be illustrative and not restrictive.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover all suitable changes in technology.

What is claimed is:

1. A method for equalizing a digital signal at an equalizer, comprising:
　receiving, at the equalizer, a plurality of samples of the signal in a plurality of unit intervals (UIs) of a channel response of the digital signal, the plurality of samples comprising a first plurality of samples of a primary response and a second plurality of samples of one or more reflection responses;
　equalizing, by the equalizer, the first plurality of samples using a first set bitwidth;
　equalizing the second plurality of samples using one or more further set bitwidths, wherein the first set bitwidth is greater than each of the one or more further set bitwidths; and
　generating, by the equalizer, an equalized digital signal.

2. The method of claim 1, wherein the plurality of UIs comprises a primary response UI section and one or more reflection response UI sections subsequent to the primary response UI section in time, the primary response UI section comprising the first plurality of samples and one or more reflection response UI sections comprising the second plurality of samples.

3. The method of claim 2, wherein the primary response UI section and one or more reflection response UI sections comprise a continuous UI span of the channel response.

4. The method of claim 2, wherein the primary response UI section and one or more reflection response UI sections comprise discrete UI spans in the channel response.

5. The method of claim 1, wherein the primary response has an amplitude peak greater than each peak of the one or more reflection responses.

6. The method of claim 1, wherein the first plurality of samples comprises all non-zero amplitude samples of the primary response.

7. The method of claim 6, wherein the first plurality of samples further comprises one or more zero amplitude samples at each end of the primary response.

8. The method of claim 1, wherein the second plurality of samples comprise all non-zero amplitude samples of the one or more reflection responses.

9. The method of claim 8, wherein the second plurality of samples further comprise one or more zero amplitude samples at each end of each of the one or more reflection responses.

10. The method of claim 1, wherein the one or more further set bitwidths for each of the one or more reflection responses are identical.

11. The method of claim 1, wherein the one or more further set bitwidths decrease for successive bitwidths that respectively correspond to successive reflections of the of one or more reflection responses.

12. The method of claim 1, wherein equalizing the first plurality of samples and the second plurality of samples comprises:
　delaying, by a plurality of delays of the equalizer, each of the first plurality of samples and the second plurality of samples;
　applying a weight, at a plurality of multipliers of the equalizer, to each of the delayed samples; and
　adding, at one or more adders, the weighted samples for generating an equalized signal.

13. The method of claim 1, wherein equalizing the first plurality of samples and the second plurality of samples comprises:
　applying a weight, at a plurality of multipliers of the equalizer, to each of the first plurality of samples and the second plurality of samples;
　generating, at one or more adders of the equalizer, a plurality of partial products from the weighted samples;
　delaying, by a plurality of delays of the equalizer, each of the plurality of partial products; and
　adding, at one or more adders, weighted partial products for generate an equalized signal.

14. The method of claim 1, further comprising equalizing the first plurality of samples with a plurality of fixed taps and equalizing the second plurality of samples with a plurality of roaming taps.

15. An equalizer for equalizing a digital signal, comprising:
　a plurality of delays;
　a plurality of multiplexers; and
　one or more adders,
　wherein the equalizer is configured to:
　　receive, at the plurality of delays or at the plurality of multiplexers, a plurality of samples of the signal in a plurality of unit intervals (UIs) of a channel response of the digital signal, the plurality samples comprising a first plurality of samples of a primary response and a second plurality of samples of one or more reflection responses;
　　equalize, at the plurality of delays and the plurality of multiplexers, the first plurality of samples using a first set bitwidth;
　　equalize, at the plurality of delays and the plurality of multiplexers, the second plurality of samples using one or more further bitwidths, wherein the first set bitwidth is greater than each of the one or more further bitwidths; and
　　generate, at the one or more adders, an equalized digital signal.

16. The equalizer of claim 15, wherein the equalizer comprises a feed-forward equalizer (FFE).

17. The equalizer of claim 15, wherein the equalizer comprises a decision feedback equalizer (DFE).

18. The equalizer of claim 15, wherein the equalizer comprises an equalizer in an Analog to Digital converter.

19. The equalizer of claim 15, wherein each of the second plurality of samples has an amplitude greater than or equal to a predetermined threshold.

20. The equalizer of claim 16, wherein the equalizer is a parallel equalizer for concurrently equalizing 32, 64, or 128 digital signals.

* * * * *